Figure 1:
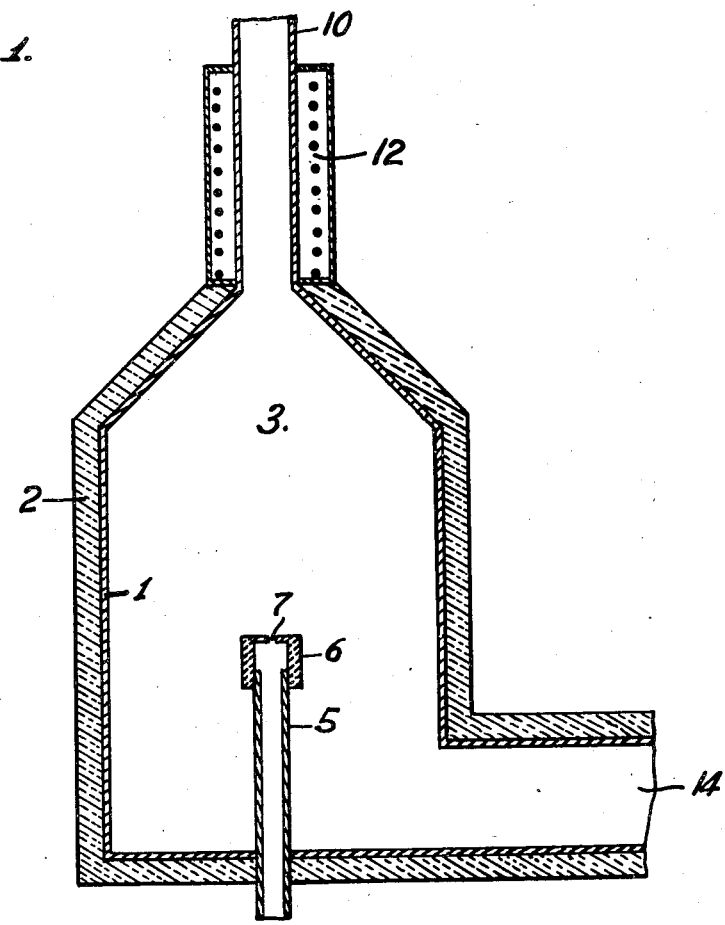

Sept. 28, 1948.  A. PECHUKAS  2,450,156
PROCESS OF AND APPARATUS FOR
PRODUCING TITANIUM DIOXIDE
Filed June 7, 1944

INVENTOR.
ALPHONSE PECHUKAS
BY Olen E Bee
ATTORNEY

Patented Sept. 28, 1948

2,450,156

UNITED STATES PATENT OFFICE 2,450,156

PROCESS OF AND APPARATUS FOR PRODUCING TITANIUM DIOXIDE

Alphonse Pechukas, Akron, Ohio, assignor to Pittsburgh Plate Glass Company, Allegheny County, Pa., a corporation of Pennsylvania Application June 7, 1944, Serial No. 539,067

7 Claims. (Cl. 23—202)

1

The present invention relates to the production of pigmentary materials and more particularly to a method of and apparatus for preparing finely-divided titanium dioxide by the reaction of oxygen with vaporized titanium tetrachloride, while minimizing crystal formation by conducting the reaction out of substantial contact with hot surfaces.

One object of my invention is to provide a method of producing finely-divided titanium dioxide wherein an envelope of vaporized titanium tetrachloride surrounds the inlet for this reagent into the reaction chamber and thus precludes crystal formation at this point.

Another object of the invention is the provision of a process of producing finely-divided titanium dioxide wherein the vaporized titanium tetrachloride and oxygen are mixed within a reaction chamber and the reaction zone is maintained substantially out of contact with hot surfaces.

A further object of the invention is the provision of apparatus for introducing a gaseous reactant into a reaction chamber at a point in the interior thereof, while masking the inlet in order to prevent the reaction from occurring immediately adjacent thereto.

Other objects and advantages of the invention will be apparent from the following detailed description of certain preferred embodiments thereof.

The reaction between oxygen and titanium tetrachloride at elevated temperatures to produce titanium dioxide has been the subject of considerable investigation. Direct production of titanium dioxide in this manner is more economical than those processes involving intermediate hydrolysis of titanium tetrachloride.

Early experiments, wherein titanium chloride was reacted with oxygen, produced titanium dioxide of which a large percentage was in crystalline form. This necessitated comminution or classification thereof prior to use of the material as a pigment. U. S. Patents No. 2,240,343, issued April 29, 1941, and No. 2,340,610, issued February 1, 1944, pointed out that crystalline titanium dioxide resulted when the oxidation of titanium tetrachloride occurred adjacent interior surfaces of the reaction chamber. Several methods of avoiding crystal formation are described in said patents.

The present invention contemplates an improvement over the known processes hereinbefore mentioned in that a more finely-divided product with improved properties is obtained. In the process of the invention, countercurrent streams

2 of oxygen or air and vaporized titanium tetrachloride are injected into a reaction chamber and merged within a reaction zone which is maintained substantially out of contact with the hot surfaces of the reaction chamber. The titanium tetrachloride is oxidized, resulting in the formation of titanium dioxide and chlorine, and the reaction products are withdrawn from the reaction chamber. The reaction products pass the titanium tetrachloride inlet and in order to mask or blanket this inlet, a portion of the titanium tetrachloride is diffused through the side walls of the inlet to establish a constantly maintained envelope of vaporized titanium tetrachloride around the inlet. In this fashion, the atmosphere immediately adjacent the inlet will contain no oxygen or at the most insufficient oxygen to react with the titanium tetrachloride in contact with the inlet whereby crystal formation at this point will be obviated.

Figure 2:
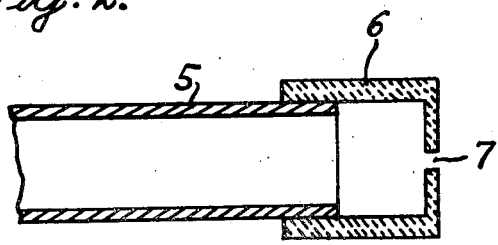

The accompanying drawing is illustrative of apparatus which is suitable for use in accordance with my invention: Fig. 1 is a vertical sectional view of the apparatus and Fig. 2 is a sectional view, on an enlarged scale, of the titanium tetrachloride inlet.

Referring to the drawing, a vertical furnace 1 protected by a shell 2 of insulating material defines a reaction chamber 3. Extending through the base of the furnace 1 and approaching the reaction chamber 3 is a tube 5 which serves as a conduit for titanium tetrachloride vapors generated from a convenient supply thereof or emanating directly from a furnace wherein titanium ores are chlorinated. A porous nozzle 6 substantially of cup-shape in cross-section and having an orifice 7 is secured to the end of the tube 5. Unglazed porcelain, Alundum or other suitable porous refractory material is used in forming the nozzle 6. It is desired that the porosity of the refractory should be such that the resistance to flow of gas occasioned by the design of the nozzle will permit diffusion of from 5 to 15 percent of the vaporized titanium tetrachloride through the walls of the nozzle.

A conduit 10 surrounded by an induction heater 12 or other suitable heating means is provided at the upper end of the furnace 1 for the introduction of oxygen or air into the reaction chamber 3. The furnace 1 also has an outlet 14 through which the reaction products are withdrawn and conveyed to a suitable separation chamber (not shown).

In the operation of this apparatus, a stream of vaporized titanium tetrachloride is injected into the reaction chamber 3 through the tube 5 and at the same time a stream of oxygen or air preheated to a temperature of approximately 1100° C. is injected into the reaction chamber 3 through the conduit 10 and into contact with the stream of vaporized tetrachloride. The rates of introduction of the two streams of reactants are so regulated that the point of contact and the resultant reaction zone will be established at a central point within the chamber 3 remote from the walls of the furnace. As the vaporized titanium tetrachloride passes through the tube 5, a portion thereof diffuses through the porous nozzle 6 to establish a constantly maintained fluid envelope of vaporized titanium tetrachloride substantially free of oxygen containing gases about the nozzle, thus precluding the possibility of reaction between titanium tetrachloride and oxygen adjacent the titanium tetrachloride inlet.

The countercurrent streams of reactants meet at a point within the reaction chamber and since the oxygen or air is heated above that temperature necessary for reaction with titanium tetrachloride, the reaction is initiated upon contact. The reaction, itself, is exothermic and no trouble is experienced in maintaining reaction temperatures. The titanium tetrachloride is oxidized to form titanium dioxide, chlorine also being generated, within the reaction zone and the reaction is substantially completed in this zone so that little or no oxidation occurs adjacent the hot surfaces of the reaction chamber, as the mixed gases and reaction products move outwardly into contact therewith. The reaction products, in being withdrawn from the furnace, pass the titanium tetrachloride inlet. The envelope of vaporized titanium tetrachloride surrounding this inlet will prevent establishment of a reactive mixture of gases adjacent the hot surface of the inlet, should any oxygen remain in the body of reaction products, and there will be no oxidation of titanium tetrachloride at the inlet.

It will be seen, therefore, that an excess of oxygen or air may be introduced into the reaction chamber to insure complete oxidation of the titanium tetrachloride in the reaction zone out of contact with the hot surfaces of the reaction chamber without deleterious result. Under these conditions, oxygen will be present in the body of reaction products but will be prevented from contacting and reacting with the titanium tetrachloride at its point of injection into the reaction chamber by the envelope of titanium tetrachloride constantly maintained about that inlet.

While the temperature at which the oxidation of titanium tetrachloride is effected may be varied considerably it is preferred to maintain a temperature of approximately 1000° C. in the reaction zone of the reaction chamber in order to obtain optimum operation conditions. The temperature of reaction may be readily controlled by regulation of the temperature of the preheated oxygen or air entering the furnace.

The following examples are illustrative of my process:

Example I

Using an apparatus having the general structure as shown in the accompanying drawing with a porous cup of "Alundum," a fused alumina refractory, having walls approximately $\frac{1}{16}$ of an inch in thickness projecting 1 inch beyond the end of the conduit and having a ¼ inch orifice, vaporized titanium tetrachloride at a temperature of about 500° C. was introduced at a rate of approximately 25 pounds per hour into a reaction chamber having an internal diameter of 14 inches. A countercurrent stream of air preheated to a temperature of 1100° C. was introduced into the furnace at a rate of 5.5 cubic feet per minute. The reaction temperature was thus maintained substantially at 1055° C. throughout the reaction. At the end of 2½ hours with an input of 66 pounds of titanium tetrachloride, there was obtained a yield of 79 percent (based upon the titanium tetrachloride) of pigmentary titanium dioxide containing substantially no crystals. At the end of the run, the furnace was inspected and it was found to be free of any crystal growth, proving the reaction to have taken place substantially out of contact with the walls of the furnace.

Example II

Experiment I was repeated under substantially the same conditions, with the exception that the temperature within the reaction chamber was maintained at 1000° C. 64.5 pounds of vaporized titanium tetrachloride was introduced into the furnace at the rate of 25 pounds per hour and there was obtained a yield of 88 percent of pigmentary titanium dioxide. Again there was no crystal formation.

In order to demonstrate the efficacy of my invention a test run was made using apparatus and conditions as described in Example I with the exception that the porous nozzle was removed from the titanium tetrachloride inlet. It was necessary to halt the run at the end of 35 minutes because the conduit became plugged with a hard formation of titanium dioxide. There was obtained a 76 percent yield of titanium dioxide but approximately 30 percent of the material was in crystalline form entirely unsuitable for use as a pigment.

Although the process has been described in connection with the production of titanium dioxide it is not so limited, but may be applied to the oxidation of other metallic halides which will react with oxygen, as well as to oxidation of titanium tetrachloride admixed with other metallic halides incident to the production of mixed pigments.

It will at once be obvious that various modifications in the procedural details and manipulative steps are possible without departing from the spirit of the invention or the scope of the appended claims. The present application is a continuation in part of my copending application Serial No. 509,703, now Patent No. 2,437,171, filed November 10, 1943.

What I claim is:

1. In a process of preparing titanium dioxide by reaction of oxygen with vaporized titanium tetrachloride while minimizing crystal formation by conducting the reaction out of substantial contact with hot surfaces, the steps which comprise injecting a portion of a stream of vaporized titanium tetrachloride into a reaction zone through a nozzle, diffusing a further portion of said stream transversely to the direction of flow thereof through the nozzle wall and into the reaction zone, and injecting a countercurrent stream of preheated oxygen into the reaction zone and into contact with the portion of the vaporized titanium tetrachloride stream issuing from the nozzle; the portion of the vaporized titanium tetrachloride stream issuing from the nozzle and the oxygen stream being so regulated as to meet at a point remote from the bounding surfaces of the reaction zone.

2. In a process of preparing titanium dioxide by reaction of oxygen with vaporized titanium tetrachloride while minimizing crystal formation by conducting the reaction out of substantial contact with hot surfaces, steps which comprise injecting a major portion of a stream of vaporized titanium tetrachloride into a reaction zone through a nozzle, diffusing a minor portion of said stream transversely to the direction of flow thereof thru the nozzle wall and into said reaction zone, and injecting a countercurrent stream of preheated oxygen into the reaction zone and into contact with the major portion of the vaporized titanium tetrachloride stream issuing from the nozzle; the streams being so regulated as to meet at a point remote from the bounding surfaces of the reaction zone.

3. The process of claim 1 wherein 5 to 15% of the titanium tetrachloride stream is diffused through the nozzle wall.

4. Apparatus for conducting a gas phase reaction comprises; walls defining a reaction chamber, a conduit extending into the chamber and terminating therein at a point spaced from the walls of the chamber, a refractory nozzle having a porous wall attached to the end of the conduit, a second conduit for conducting a reactant into the reaction chamber; said second conduit being spaced from and directed toward the nozzle, and means for heating said second conduit.

5. Apparatus for conducting a gas phase reaction which comprises: walls defining a reaction chamber, a conduit extending into the chamber and terminating therein at a point spaced from the walls of the chamber, a refractory nozzle having a porous wall attached to the end of the conduit, a second conduit for conducting a reactant into the reaction chamber; said conduit being in front of and directed toward the nozzle and means for heating said second conduit.

6. In the process of preparing titanium dioxide by reaction of vaporized titanium tetrachloride with oxygen in a reaction zone while maintaining a substantially non-reacting atmosphere adjacent to the titanium tetrachloride inlet the step which comprises injecting a portion of a stream of vaporized titanium tetrachloride into a reaction zone through a nozzle and diffusing a further portion of said stream transversely to the direction of flow thereof through the nozzle wall and into the reaction zone.

7. In the process of preparing metallic oxides by reaction of a vaporized metallic halide which is capable of reacting with oxygen in a reaction zone while maintaining a substantially non-reacting atmosphere adjacent to the metallic halide inlet, the step which comprises injecting a portion of a stream of the vaporized metallic halide into a reaction zone through a nozzle, and diffusing a further portion of said stream transversely to the direction of flow thereof through the nozzle wall and into the reaction zone.

ALPHONSE PECHUKAS.

REFERENCES CITED

The following references are of record in the file of this patent:

UNITED STATES PATENTS

| Number | Name | Date |
| --- | --- | --- |
| 2,240,343 | Muskat | Apr. 29, 1941 |
| 2,340,610 | Muskat et al. | Feb. 1, 1944 |
| 2,383,946 | Tiety | Sept. 4, 1945 |